(12) United States Patent
Jefferson

(10) Patent No.: US 11,162,749 B1
(45) Date of Patent: Nov. 2, 2021

(54) FIREARM TRIGGER LOCK ASSEMBLY

(71) Applicant: Vernon Jefferson, San Diego, CA (US)

(72) Inventor: Vernon Jefferson, San Diego, CA (US)

(*) Notice: Subject to any disclaimer, the term of this patent is extended or adjusted under 35 U.S.C. 154(b) by 0 days.

(21) Appl. No.: 17/011,387

(22) Filed: Sep. 3, 2020

(51) Int. Cl.
*F41A 17/04* (2006.01)
*G01S 19/42* (2010.01)

(52) U.S. Cl.
CPC ............... *F41A 17/04* (2013.01); *G01S 19/42* (2013.01)

(58) Field of Classification Search
CPC ........ F41A 17/04; F41A 17/06; F41A 17/066; F41A 17/063; F41A 17/22; F41A 17/20; G01S 19/42
USPC ................................... 42/70.06, 70.11, 70.07
See application file for complete search history.

(56) References Cited

U.S. PATENT DOCUMENTS

| | | | |
|---|---|---|---|
| 5,022,175 A * | 6/1991 | Oncke | F41A 17/04 42/66 |
| 5,025,582 A * | 6/1991 | Mote, Sr. | F41A 17/46 42/70.06 |
| 5,392,552 A | 2/1995 | McCarthy | |
| 5,412,959 A * | 5/1995 | Bentley | E05B 67/003 42/66 |
| 5,448,847 A | 9/1995 | Teetzel | |
| 5,720,193 A | 2/1998 | Dick | |
| 5,743,039 A | 4/1998 | Garrett | |
| 6,735,897 B1 * | 5/2004 | Schmitter | F41A 17/063 42/70.01 |
| 7,339,456 B1 | 3/2008 | Buckley | |
| 2013/0019510 A1 * | 1/2013 | Kemmerer | F41A 17/20 42/1.01 |
| 2013/0019512 A1 * | 1/2013 | Kemmerer | F41A 17/066 42/70.05 |
| 2013/0125441 A1 * | 5/2013 | Westwood | F41A 17/02 42/70.05 |
| 2014/0150316 A1 | 6/2014 | Acarrets | |
| 2015/0184964 A1 * | 7/2015 | Milde, Jr. | F41A 17/066 42/70.11 |
| 2016/0202009 A1 * | 7/2016 | Olivas, Jr. | F41A 17/22 42/70.06 |
| 2018/0356172 A1 | 12/2018 | Mack | |

FOREIGN PATENT DOCUMENTS

| | | |
|---|---|---|
| GB | 2228787 | 9/1990 |
| WO | WO2012140282 | 10/2012 |

* cited by examiner

*Primary Examiner* — John Cooper

(57) ABSTRACT

A firearm trigger lock assembly for inhibiting a firearm from being fired includes a sleeve that can be positioned around a grip of a firearm. A wedge is coupled to the sleeve thereby facilitating the wedge to be positioned behind a trigger of the firearm when the sleeve is positioned around the grip. A locking unit is coupled to the sleeve and the wedge is removably engaged to the locking unit. The wedge is locked behind the trigger when the locking unit is turned on to inhibit the firearm from being fired. Conversely, the wedge is removable from behind the trigger when the locking unit is turned off to facilitate the firearm to be fired.

11 Claims, 6 Drawing Sheets

FIREARM TRIGGER LOCK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lock devices and more particularly pertains to a new lock device for inhibiting a firearm from being fired.

(2) Description of Related Art Including Information Disclosed Under 37 CFR 1.97 and 1.98

The prior art relates to lock devices including a variety of electromechanical locking mechanisms that are integrated into a firearm and that are remotely controlled for locking and unlocking a firearm. The prior art discloses a variety of trigger locks that include a first portion that extends through a trigger guard of a firearm and a second portion that engages the first portion to inhibit the firearm from being fired.

BRIEF SUMMARY OF THE INVENTION

An embodiment of the disclosure meets the needs presented above by generally comprising a sleeve that can be positioned around a grip of a firearm. A wedge is coupled to the sleeve thereby facilitating the wedge to be positioned behind a trigger of the firearm when the sleeve is positioned around the grip. A locking unit is coupled to the sleeve and the wedge is removably engaged to the locking unit. The wedge is locked behind the trigger when the locking unit is turned on to inhibit the firearm from being fired. Conversely, the wedge is removable from behind the trigger when the locking unit is turned off to facilitate the firearm to be fired.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
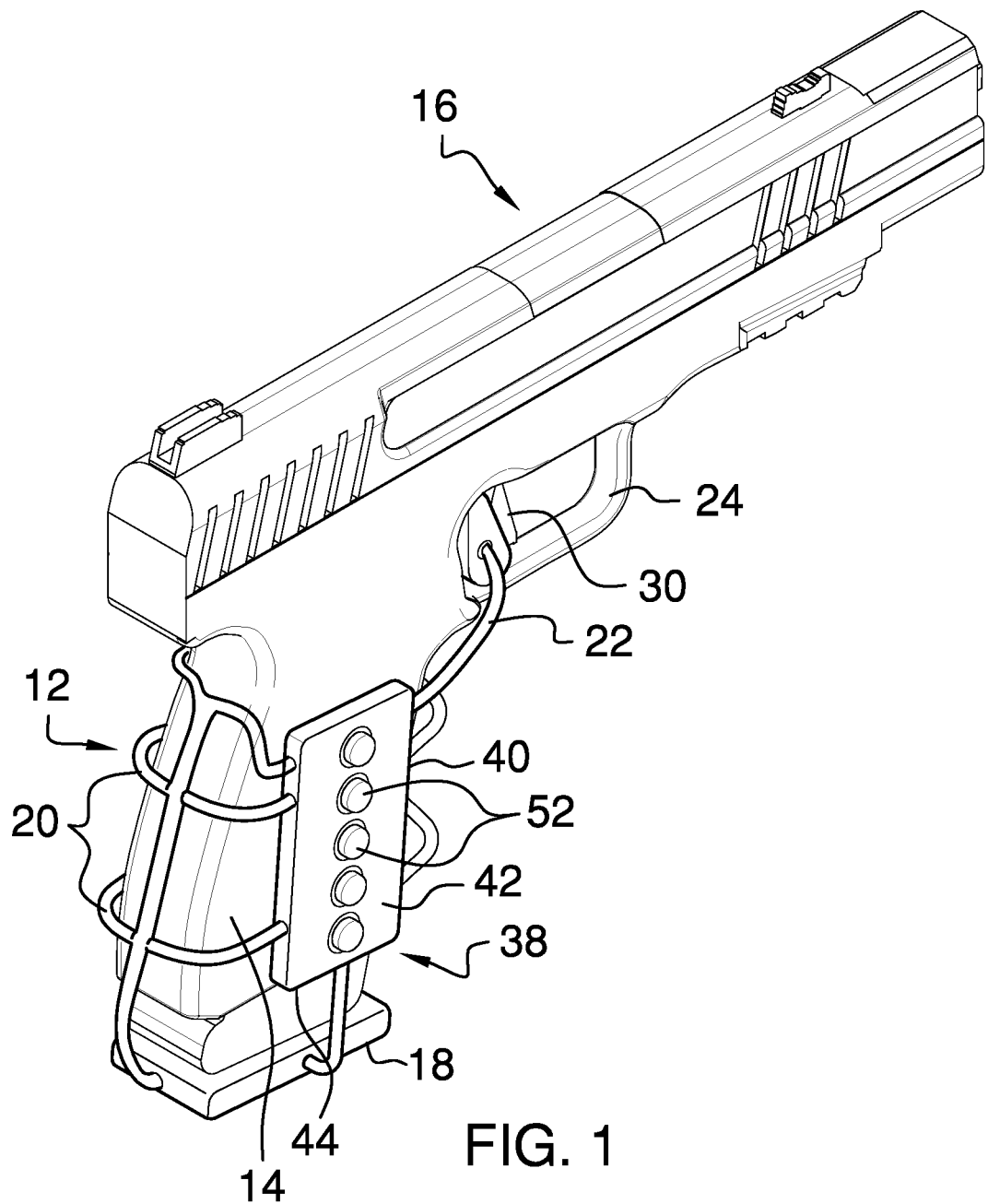
FIG. 1 is a perspective in-use view of a firearm trigger lock assembly according to an embodiment of the disclosure.
Figure 2:
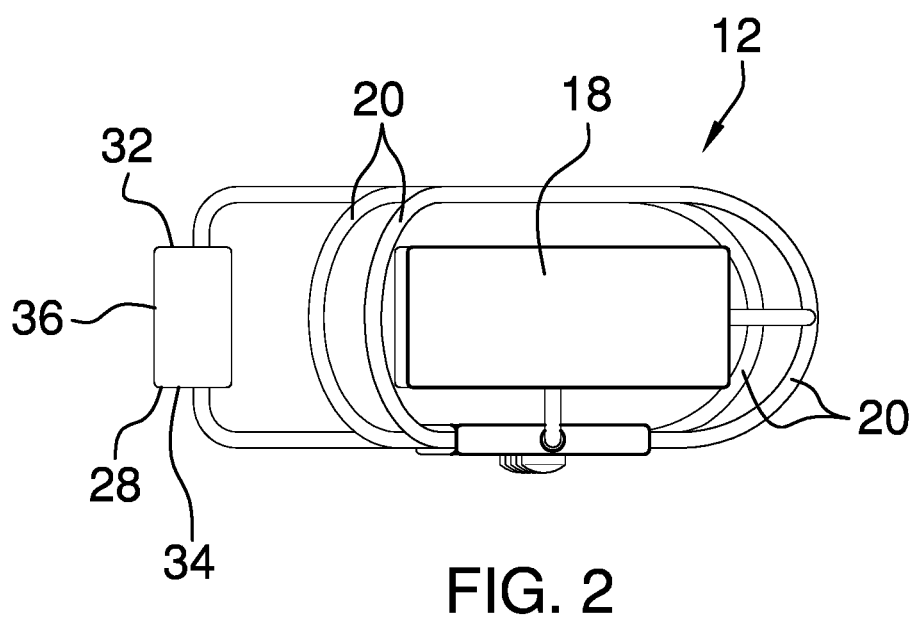
FIG. 2 is a bottom view of an embodiment of the disclosure.
Figure 3:
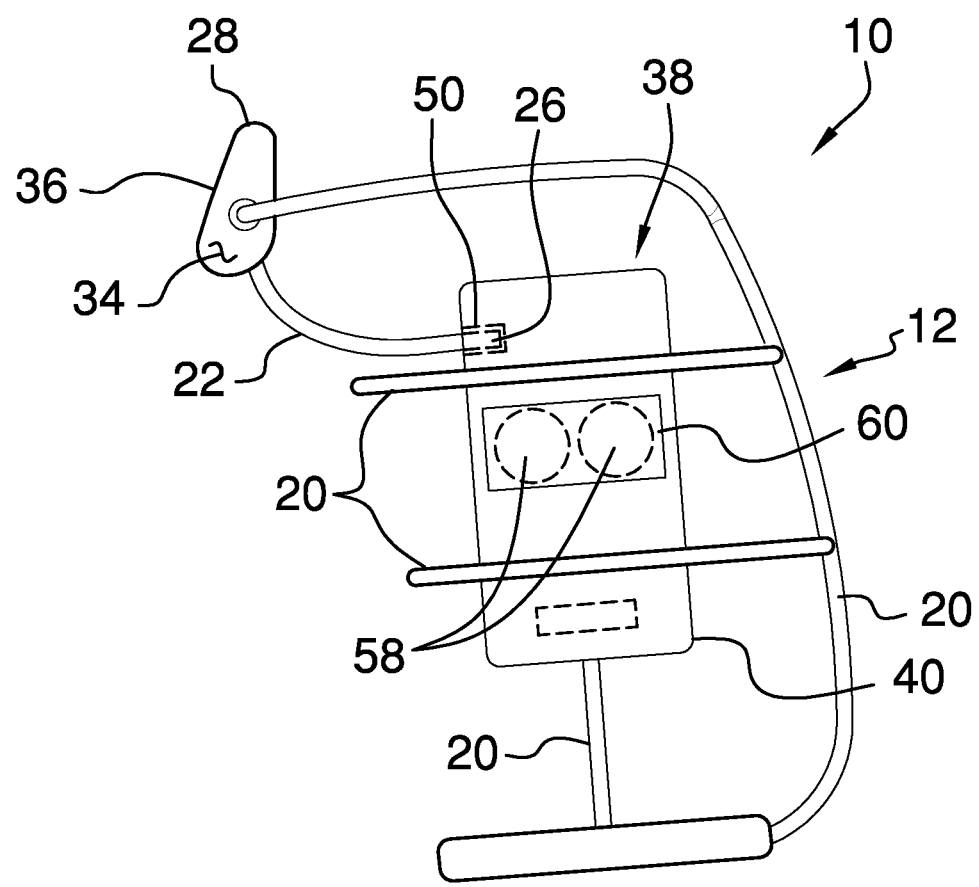
FIG. 3 is a left side phantom view of an embodiment of the disclosure.
Figure 4:
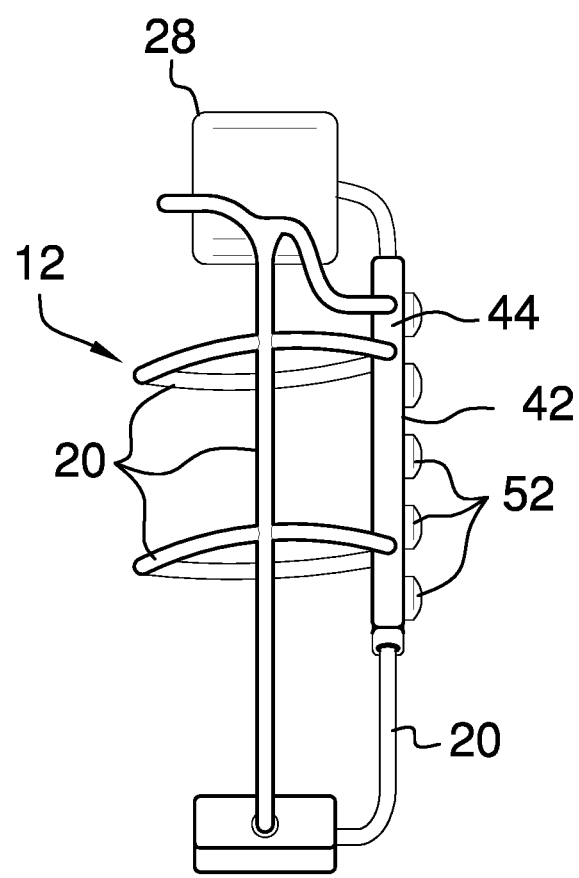
FIG. 4 is a back view of an embodiment of the disclosure.
Figure 5:
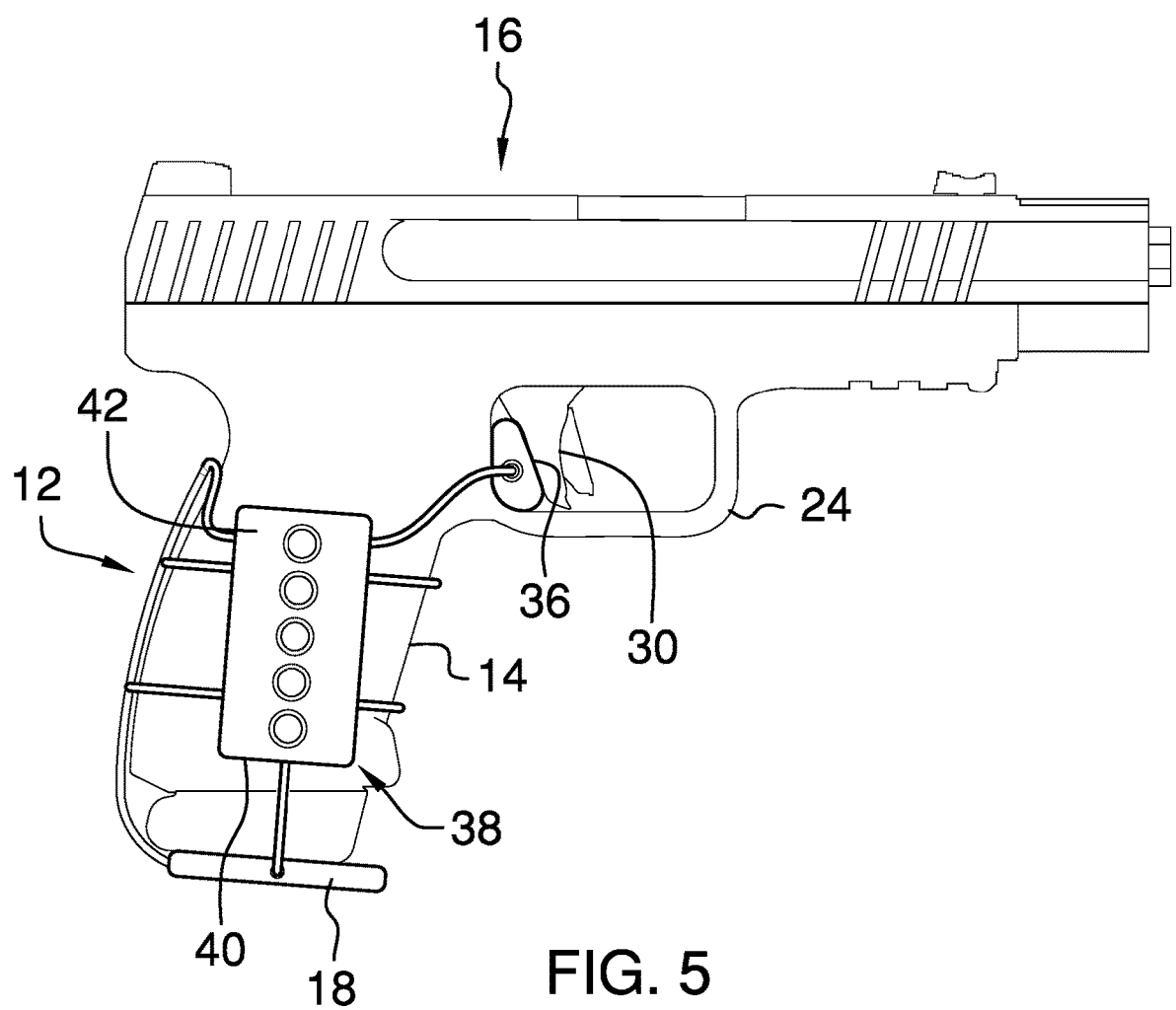
FIG. 5 is a right side in-use view of an embodiment of the disclosure.
Figure 6:
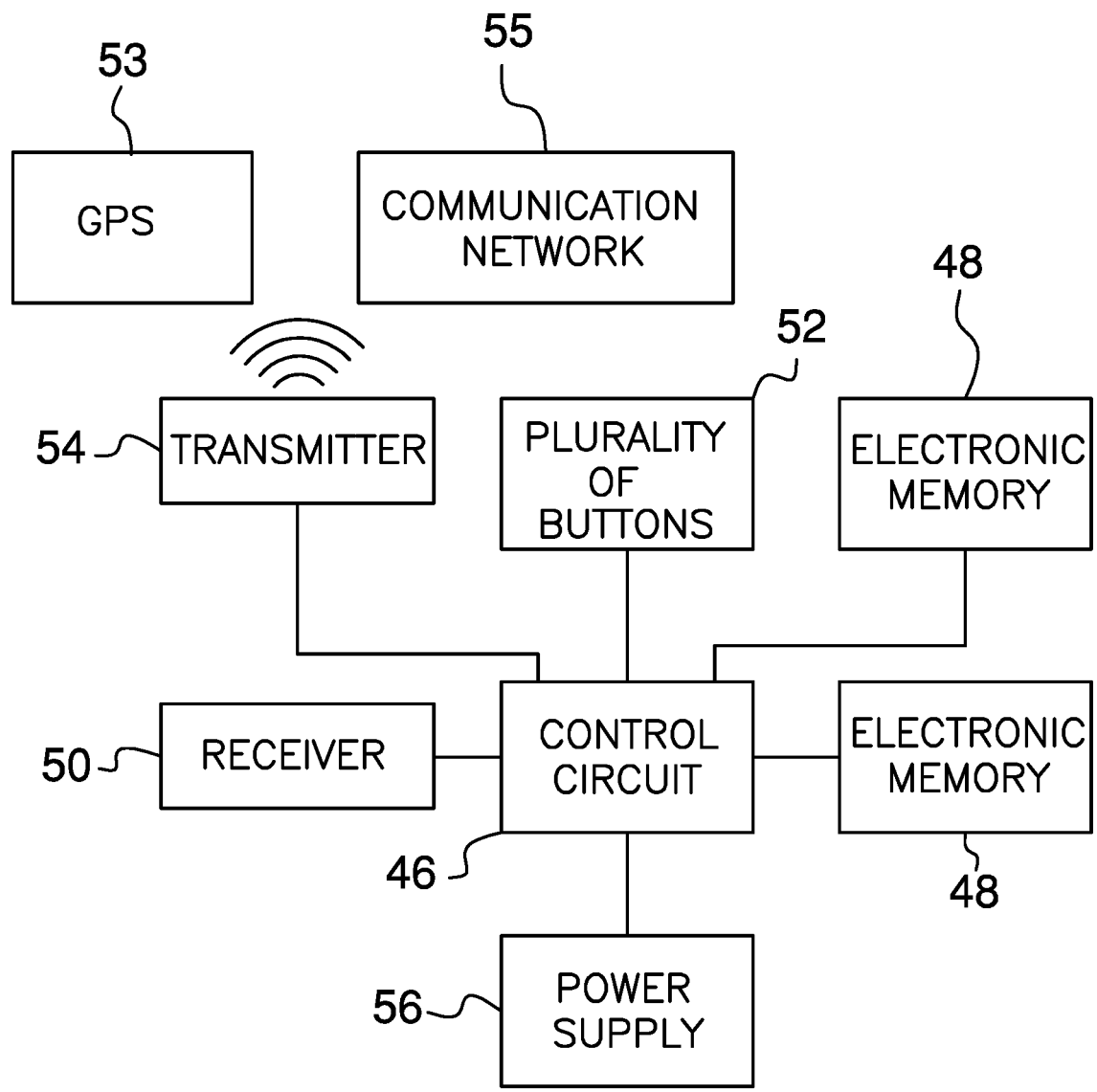
FIG. 6 is a schematic view of an embodiment of the disclosure.

With reference now to the drawings, and in particular to FIGS. 1 through 6 thereof, a new lock device embodying the principles and concepts of an embodiment of the disclosure and generally designated by the reference numeral 10 will be described.

As best illustrated in FIGS. 1 through 6, the firearm trigger lock assembly 10 generally comprises a sleeve 12 that can be positioned around a grip 14 of a firearm 16. The sleeve 12 has a bottom plate 18 and a plurality of intersecting wires 20. The bottom plate 18 abuts a bottom of the grip 14 and the plurality of intersecting wires 20 extends around the grip 14. The plurality of intersecting wires 20 includes a topmost wire 22 that is routed through a trigger guard 24 of the firearm 16 and the topmost wire 22 has a free end 26. The firearm 16 may be a handgun of any conventional design, including but not being limited to, semi automatic handguns and revolvers.

A wedge 28 is coupled to a respective one of the intersecting wires 20 such that the wedge 28 can be positioned behind a trigger 30 of the firearm 16 when the sleeve 12 is positioned around the grip 14. The wedge 28 has a first lateral surface 32, a second lateral surface 34 and a front surface 36 extending therebetween. The front surface 36 is sloped to engage the trigger 30 when the wedge 28 is positioned behind the trigger 30. Additionally, the topmost wire 22 extends through the first lateral surface 32 and the second lateral surface 34 of the wedge 28.

A locking unit 38 is provided and the locking unit 38 is coupled to the sleeve 12. The respective intersecting wire 20 to which the wedge 28 is coupled is removably attached to the locking unit 38. Moreover, the respective intersecting wire 20 is locked to the locking unit 38 when the locking unit 38 is turned on. In this way the locking unit 38 inhibits the firearm 16 from being fired. The respective intersecting wire 20 is removable from the locking unit 38 when the locking unit 38 is turned off to facilitate the firearm 16 to be fired.

The locking unit 38 comprises a housing 40 that has a front wall 42 and a perimeter wall 44, and each of the intersecting wires 20 of the sleeve 12 is coupled to the perimeter wall 44. A control circuit 46 is positioned in the housing 40 and the control circuit 46 receives an unlock input and a lock input. An electronic memory 48 is positioned in the housing 40 and the electronic memory 48 is electrically coupled to the control circuit 46. The electronic memory 48 stores data comprising a predetermined access code.

A receiver 50 is integrated therein and the receiver 50 is electrically coupled to the control circuit 46. The receiver 50 locks the free end 26 of the topmost wire 22 of the sleeve 12 when the free end 26 is inserted into the receiver 50. Additionally, the receiver 50 releases the free end 26 when the control circuit 46 receives the unlock input. The receiver 50 may comprise an electro-mechanical device that can engage and disengage the free end 26.

A plurality of buttons 52 is each movably coupled to the front wall 42 of the housing 40 and each of the buttons 52 is electrically coupled to the control circuit 46. Each of the buttons 52 is assigned an alpha numeric identity to facilitate a user to enter an access code for releasing the free end 26 from the receiver 50. The control circuit 46 receives the unlock input when the buttons 52 are manipulated to enter an access code that matches the predetermined access code stored in the electronic memory 48.

A transmitter 54 is positioned in the housing 40 and the transmitter 54 is electrically coupled to the control circuit 46. The transmitter 54 is in wireless communication with a global positioning system (gps) 53 to identify the physical location of the firearm 16. The transmitter 54 is turned on when the control circuit 46 receives the unlock input. The transmitter 54 is additionally in wireless communication with a communication network 55 thereby facilitating the transmitter 54 to broadcast an alert signal to local law enforcement. Additionally, the transmitter 54 may comprise a radio frequency transmitter or the like. A power supply 56 is positioned in the housing 40, the power supply 56 is electrically coupled to the control circuit 46 and the power supply 56 comprises at least one battery 58. A battery cover 60 is removably coupled to the housing 40 and the power supply 56 is positioned behind the battery cover 60.

In use, the sleeve 12 is positioned around the grip 14 and the topmost wire 22 is extended through the trigger guard 24 to position the wedge 28 behind the trigger 30. The free end 26 of the topmost wire 22 is inserted into the receiver 50 to lock the wedge 28 behind the trigger 30. In this way the firearm 16 is inhibited from being fired. The buttons 52 are manipulated to enter the access code which allows the free end 26 of the topmost wire 22 to be released from the receiver 50. In this way the wedge 28 and the sleeve 12 are removable from the firearm 16 thereby facilitating the firearm 16 to be fired. The transmitter 54 broadcasts the alert signal to local law enforcement when the sleeve 12 or the wedge 28 are forcibly removed from the firearm 16 thereby facilitating local law enforcement to respond to a potentially stolen firearm 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firearm trigger lock assembly for inhibiting a firearm from being fired by an unauthorized user, said assembly comprising:
    a sleeve being configured to be positioned around a grip of a firearm, said sleeve comprising a plurality of intersecting wires;
    a wedge being coupled to a respective one of said intersecting wires wherein said wedge is configured to be positioned behind a trigger of the firearm when said sleeve is positioned around the grip; and
    a locking unit being coupled to said sleeve, said respective intersecting wire to which said wedge is coupled being removably attached to said locking unit, said respective intersecting wire being locked to said locking unit when said locking unit is turned on wherein said locking unit is configured to inhibit the firearm from being fired, said respective intersecting wire being removable from said locking unit when said locking unit is turned off wherein said locking unit is configured to facilitate the firearm to be fired.

2. The assembly according to claim 1, wherein said sleeve has a bottom plate having each of said a plurality of intersecting wires being coupled thereto wherein said bottom plate is configured to abut a bottom of the grip having said plurality of intersecting wires extending around the grip, said plurality of intersecting wires including a topmost wire being configured to be routed through a trigger guard of the firearm, said topmost wire having a free end.

3. The assembly according to claim 2, wherein said wedge has a first lateral surface, a second lateral surface and a front surface extending therebetween, said front surface being sloped wherein said front surface is configured to engage the trigger when said wedge is positioned behind the trigger, said topmost wire extending through said first lateral surface and said second lateral surface.

4. The assembly according to claim 2, wherein said locking unit comprises a housing having a front wall and a perimeter wall, each of said intersecting wires of said sleeve being coupled to said perimeter wall.

5. The assembly according to claim 4, wherein said locking unit includes a control circuit being positioned in said housing, said control circuit receiving an unlock input and a lock input.

6. The assembly according to claim 5, wherein said locking unit includes an electronic memory being positioned in said housing, said electronic memory being electrically coupled to said control circuit, said electronic memory storing data comprising a predetermined access code.

7. The assembly according to claim 6, wherein said locking unit includes a plurality of buttons, each of said buttons being movably coupled to said front wall of said housing, each of said buttons being electrically coupled to said control circuit, each of said buttons being assigned an alpha numeric identity wherein said plurality of buttons is configured to facilitate a user to enter an access code for releasing said free end from said receiver, said control circuit receiving said unlock input when said buttons are manipulated to enter an access code that matches said predetermined access code stored in said electronic memory.

8. The assembly according to claim 5, wherein said locking unit includes a receiver being integrated therein, said receiver being electrically coupled to said control circuit, said receiver locking said free end of said topmost wire of said sleeve when said free end is inserted into said receiver, said receiver releasing said free end when said control circuit receives said unlock input.

9. The assembly according to claim 5, wherein said locking unit includes a transmitter being positioned in said housing, said transmitter being electrically coupled to said control circuit, said transmitter being in wireless communication with a global positioning system (gps) wherein said transmitter is configured to identify the physical location of the firearm, said transmitter being turned on when said control circuit receives said unlock input.

10. The assembly according to claim 5, wherein said locking unit includes a power supply being positioned in said housing, said power supply being electrically coupled to said control circuit, said power supply comprising at least one battery.

11. A firearm trigger lock assembly for inhibiting a firearm from being fired by an unauthorized user, said assembly comprising:
- a sleeve being configured to be positioned around a grip of a firearm, said sleeve comprising a plurality of intersecting wires, said sleeve having a bottom plate having each of said plurality of intersecting wires being coupled thereto wherein said bottom plate is configured to abut a bottom of the grip having said plurality of intersecting wires extending around the grip, said plurality of intersecting wires including a topmost wire being configured to be routed through a trigger guard of the firearm, said topmost wire having a free end;
- a wedge being coupled to a respective one of said intersecting wires wherein said wedge is configured to be positioned behind a trigger of the firearm when said sleeve is positioned around the grip, said wedge having a first lateral surface, a second lateral surface and a front surface extending therebetween, said front surface being sloped wherein said front surface is configured to engage the trigger when said wedge is positioned behind the trigger, said topmost wire extending through said first lateral surface and said second lateral surface; and
- a locking unit being coupled to said sleeve, said respective intersecting wire to which said wedge is coupled being removably attached to said locking unit, said respective intersecting wire being locked to said locking unit when said locking unit is turned on wherein said locking unit is configured to inhibit the firearm from being fired, said respective intersecting wire being removable from said locking unit when said locking unit is turned off wherein said locking unit is configured to facilitate the firearm to be fired, said locking unit comprising:
  - a housing having a front wall and a perimeter wall, each of said intersecting wires of said sleeve being coupled to said perimeter wall;
  - a control circuit being positioned in said housing, said control circuit receiving an unlock input and a lock input;
  - an electronic memory being positioned in said housing, said electronic memory being electrically coupled to said control circuit, said electronic memory storing data comprising a predetermined access code;
  - a receiver being integrated therein, said receiver being electrically coupled to said control circuit, said receiver locking said free end of said topmost wire of said sleeve when said free end is inserted into said receiver, said receiver releasing said free end when said control circuit receives said unlock input;
  - a plurality of buttons, each of said buttons being movably coupled to said front wall of said housing, each of said buttons being electrically coupled to said control circuit, each of said buttons being assigned an alpha numeric identity wherein said plurality of buttons is configured to facilitate a user to enter an access code for releasing said free end from said receiver, said control circuit receiving said unlock input when said buttons are manipulated to enter an access code that matches said predetermined access code stored in said electronic memory;
  - a transmitter being positioned in said housing, said transmitter being electrically coupled to said control circuit, said transmitter being in wireless communication with a global positioning system (gps) wherein said transmitter is configured to identify the physical location of the firearm, said transmitter being turned on when said control circuit receives said unlock input; and
  - a power supply being positioned in said housing, said power supply being electrically coupled to said control circuit, said power supply comprising at least one battery.

* * * * *